US012704903B2

(12) United States Patent
Long et al.

(10) Patent No.: US 12,704,903 B2
(45) Date of Patent: Aug. 11, 2026

(54) METHOD AND APPARATUS FOR DETERMINING WEARING STATE OF EYE-WEARABLE DEVICE

(71) Applicant: Beijing Zitiao Network Technology Co., Ltd., Beijing (CN)

(72) Inventors: Xiang Long, Beijing (CN); Liangliang Wang, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 19/118,474

(22) PCT Filed: Nov. 17, 2023

(86) PCT No.: PCT/CN2023/132163
§ 371 (c)(1),
(2) Date: Apr. 4, 2025

(87) PCT Pub. No.: WO2024/109629
PCT Pub. Date: May 30, 2024

(65) Prior Publication Data

US 2026/0133627 A1 May 14, 2026

(30) Foreign Application Priority Data

Nov. 22, 2022 (CN) ........................ 202211463308.0

(51) Int. Cl.
*G06F 3/01* (2006.01)
*G02B 27/01* (2006.01)
(Continued)

(52) U.S. Cl.
CPC ......... *G06F 3/013* (2013.01); *G02B 27/0172* (2013.01); *G06T 5/50* (2013.01); *G06T 7/73* (2017.01); *G06T 2207/20221* (2013.01)

(58) Field of Classification Search
CPC ....... G06F 3/013; G02B 27/0172; G06T 5/50; G06T 7/73; G06T 2207/20221
See application file for complete search history.

(56) References Cited

U.S. PATENT DOCUMENTS 8,958,158 B1 * 2/2015 Raffle ............... G02B 27/0172 359/630
2012/0169725 A1 7/2012 Shimizu et al.
(Continued)

FOREIGN PATENT DOCUMENTS

CN 107608512 A 1/2018
CN 109920532 A 6/2019
(Continued)

OTHER PUBLICATIONS

ISA China National Intellectual Property Administration, International Search Report and Written Opinion Issued in Application No. PCT/CN2023/132163, Jan. 16, 2024, WIPO, 9 pages.
(Continued)

*Primary Examiner* — Amit Chatly
(74) *Attorney, Agent, or Firm* — Alleman Hall LLP

(57) ABSTRACT

The embodiments of the present disclosure provide a method and apparatus for determining a wearing state of an eye-wearable device. The eye-wearable device is provided with an image acquisition device, and the image acquisition device is arranged so as to be opposite to the eyes of a user when the eye-wearable device is being worn. The method includes: acquiring an image captured by the image acquisition device; and determining the wearing state of the eye-wearable device according to the image.

18 Claims, 4 Drawing Sheets

(51) Int. Cl.

| | |
|---|---|
| ***G06T 5/50*** | (2006.01) |
| ***G06T 7/73*** | (2017.01) |

(56) References Cited

U.S. PATENT DOCUMENTS

| | | | | |
|---|---|---|---|---|
| 2016/0091720 | A1* | 3/2016 | Stafford | G02B 27/0172 345/8 |
| 2017/0102767 | A1* | 4/2017 | Kim | H04N 13/327 |
| 2017/0206673 | A1* | 7/2017 | Kawamoto | G06F 1/163 |
| 2017/0277254 | A1* | 9/2017 | Osman | A63F 13/32 |
| 2019/0073109 | A1* | 3/2019 | Zhang | G06F 3/013 |
| 2019/0377191 | A1* | 12/2019 | Hughes | G02B 27/0176 |
| 2020/0134867 | A1 | 4/2020 | Zachrisson et al. | |
| 2021/0019913 | A1* | 1/2021 | Huang | G06T 7/80 |
| 2022/0057860 | A1* | 2/2022 | Tsai | G06F 3/017 |
| 2022/0121276 | A1 | 4/2022 | Saito | |
| 2022/0276702 | A1 | 9/2022 | Alam et al. | |

FOREIGN PATENT DOCUMENTS

| | | | |
|---|---|---|---|
| CN | 110174936 | A | 8/2019 |
| CN | 114556187 | A | 5/2022 |
| CN | 115273213 | A | 11/2022 |
| JP | 2018147458 | A | 9/2018 |

OTHER PUBLICATIONS

China National Intellectual Property Administration, Office Action and Search Report Issued in Application No. 202211463308.0, May 25, 2026, 20 pages.

* cited by examiner

Acquiring an image captured by an image acquisition device — S310

↓

Determining a wearing state of an eye-wearable device according to the image — S320 acquiring a plurality of first images recently captured by a plurality of image acquisition devices and acquiring a corresponding historical image — S510 splicing the plurality of first images to obtain a target image — S520 determining the wearing state of the eye-wearable device according to the target image and the historical image — S530

METHOD AND APPARATUS FOR DETERMINING WEARING STATE OF EYE-WEARABLE DEVICE

CROSS-REFERENCE TO RELATED APPLICATION(S)

The present disclosure is a U.S. national stage application of International Patent Application No. PCT/CN2023/132163, filed on Nov. 17, 2023, which claims priority of the Chinese Patent Application No. 202211463308.0 filed with the Chinese Patent Office on Nov. 22, 2022, the entire disclosure of which is incorporated by reference in the present disclosure.

TECHNICAL FIELD

Embodiments of the disclosure relate to a method and an apparatus for determining a wearing state of an eye-wearable device.

BACKGROUND

With the development of virtual reality (VR) technology, many virtual reality devices (VR devices) have appeared, which enable people to embody virtual scenes through VR devices. VR devices can include VR head displays, VR glasses and other devices that need to be worn on the eyes. At present, VR devices generally use distance sensors such as P-sensor to sense the relative position between the human face and the VR device itself, based on which functions such as lighting up the screen of the VR device can be triggered.

SUMMARY

One or more embodiments of the present disclosure provide a method and an apparatus for determining the wearing state of an eye-wearable device, so as to accurately determine the wearing state of the eye-wearable device.

According to a first aspect, there is provided a method for determining a wearing state of an eye-wearable device, the eye-wearable device is provided with an image acquisition device configured to be opposite to eyes of a user when the eye-wearable device is worn, the method including:

- acquiring an image captured by the image acquisition device; and
- determining the wearing state of the eye-wearable device according to the image.

According to a second aspect, there is provided an apparatus for determining a wearing state of an eye-wearable device, the eye-wearable device is provided with an image acquisition device configured to be opposite to eyes of a user when the eye-wearable device is worn, the apparatus including:

- an acquisition module, configured to acquire an image captured by the image acquisition device; and
- a determination module, configured to determine the wearing state of the eye-wearable device according to the image.

According to a third aspect, there is provided a computer-readable storage medium on which a computer program is stored, the computer program, when executed in a computer, causes the computer to perform the method described in the first aspect.

According to a fourth aspect, there is provided an eye-wearable device including a memory and a processor, wherein an executable code is stored in the memory, and when the executable code is executed by the processor, the method described in the first aspect is realized.

BRIEF DESCRIPTION OF DRAWINGS

In order to explain the technical solution of the embodiments of the present disclosure more clearly, the accompanying drawings necessary for the description of the embodiments will be briefly introduced below. Obviously, the drawings described in the following description are only related to some embodiments of the present disclosure, and other drawings can be obtained according to these drawings without creative work for ordinary skilled in the art.

DETAILED DESCRIPTION

The technical solution of the embodiments of the present disclosure will be described in detail with reference to the accompanying drawings.

It can be understood that prior to using the technical solutions disclosed in various embodiments of the present disclosure, users should be informed of the types, scope of use, use scenarios, etc. of personal information involved in the present disclosure in an appropriate way according to relevant laws and regulations, and authorization from users should be acquired.

For example, in response to receiving the user's active request, prompt information is sent to the user to clearly remind the user that the operation requested by the user will require for obtaining and using the user's personal information. Therefore, the user can independently choose whether to provide personal information to software or hardware such as electronic devices (e.g., the eye-wearable device described below), application programs, servers or storage medium that perform the operation of the technical solution of the present disclosure according to the prompt information.

As an optional but non-limiting implementation, in response to receiving the user's active request, the way to send the prompt information to the user can be, for example, a pop-up window, in which the prompt information can be presented in text. Moreover, the pop-up window can also carry a selection control for the user to choose "agree" or "disagree" to provide personal information to the electronic device.

It can be understood that the above process of notifying and obtaining user's authorization is only for illustrative purpose, and is not intended to limit the implementation of the present disclosure. Other ways that satisfy relevant laws and regulations can also be applied to the implementation of the present disclosure.

The embodiment of the present disclosure discloses a method and an apparatus for determining a wearing state of an eye-wearable device. Firstly, the application scenario and technical conception of the method for determining a wearing state of an eye-wearable device are introduced as follows:

At present, VR devices that need to be worn on the eyes generally use distance sensors such as P-sensor to sense the relative position between the face and the VR device itself, based on which functions such as lighting up the screen of the VR device can be triggered. However, this method is prone to result in false triggering. For example, when a VR device is put on a desktop in a facing-down manner, the distance sensors of the VR device, such as P-sensor, will mistakenly recognize that the VR device has been worn on a human face, and then the VR device will trigger its screen to be lighted up, which will increase the power consumption of the VR device, reduce its standby time and affect the user's experience.

Figure 1:
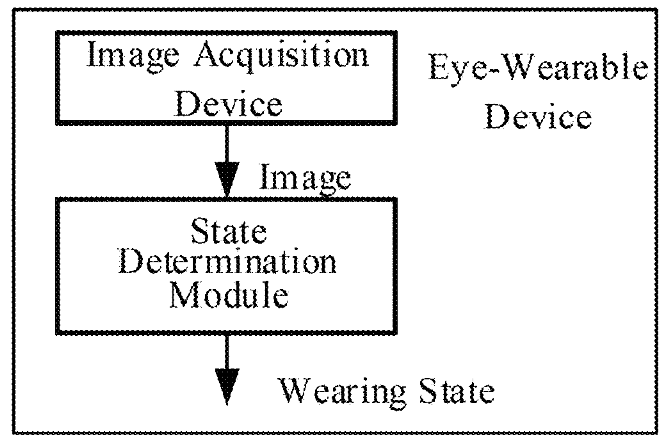
FIG. 1 is a schematic diagram of an implementation framework of an embodiment revealed in the present disclosure.

In view of this, FIG. 1 shows a schematic diagram of an implementation scenario according to one embodiment of the present disclosure. In this implementation scenario, the eye-wearable device is provided with an image acquisition device, which is set to be opposite to the user's eyes when the eye-wearable device is worn, that is, the image acquisition device can capture images for the user's eyes when the eye-wearable device is worn. Specifically, the image acquisition device can capture images according to its environment. Here, the eye-wearable device can be VR helmet, VR glasses, smart glasses and other devices that need to be worn on the eyes for use.

It can be understood that, the eye-wearable device has different wearing states, and there is difference between image contents of the images captured by the image acquisition device. For example, when the eye-wearable device is worn on the eyes, the image content of the image captured by the image acquisition device may only include the eye area of the user. For another example, when the eye-wearable device is not worn on the user's face, the image content of the image captured by the image acquisition device does not include the face, or the image content of the image captured by the image acquisition device includes the face but does not include the eye area, or it includes not only the eye area but also other facial areas (such as nose, forehead, etc.). In view of this, the module for determining the wearing state of the eye-wearable device (the state determination module as shown in FIG. 1) can obtain the images captured by the image acquisition device, and then determine the wearing state of the eye-wearable device according to the images.

In the above process, the wearing state of the eye-wearable device can be determined based on the images captured by the image acquisition device provided in the eye-wearable device, so that the accuracy of the determination result of the wearing state of the eye-wearable device can be improved, to a certain extent.

In the method and device provided by the embodiment of the present disclosure, the eye-wearable device is provided with an image acquisition device, and the image acquisition device is configured to be opposite to the user's eyes when the eye-wearable device is worn, that is, when the eye-wearable device is worn, the image acquisition device can capture images for the user's eyes, and correspondingly, the images captured by the image acquisition device are obtained firstly; further, the wearing state of the eye-wearable device is determined according to the images, so as to realize the accurate determination of the wearing state of the eye-wearable device.

In the following, the method and apparatus for determining the wearing state of the eye-wearable device provided by the present disclosure will be described in detail in connection with specific embodiments.

For the sake of clear layout, firstly, the structure of the eye-wearable device provided by the present disclosure will be described. In the embodiment of the present disclosure, the eye-wearable device is provided with an image acquisition device, which is configured to be opposite to the user's eyes when the eye-wearable device is worn. Here, one or more image acquisition devices can be provided.

Figure 2A:
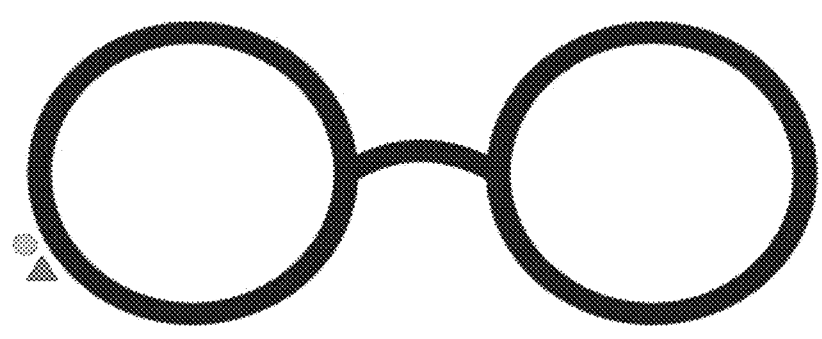
FIGS. 2A-2E are schematic structural views of an image acquisition device and a supplementary light source in an eye-wearable device provided by an embodiment.
Figure 2B:
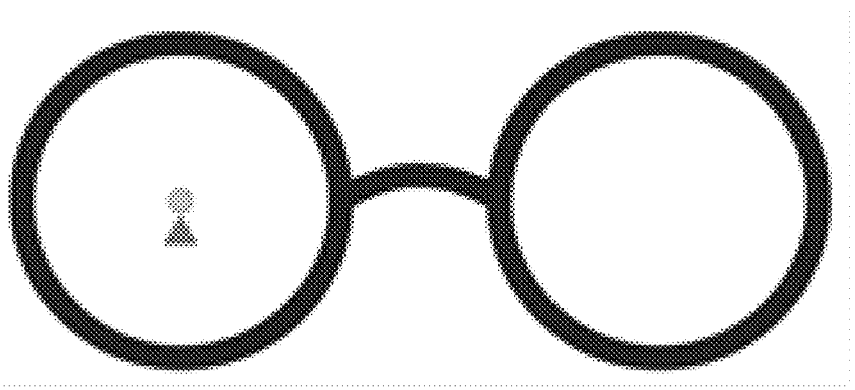

In one embodiment, in the case where there is one image acquisition device, the image acquisition device is configured to be opposite to the left eye or the right eye of the user when the eye-wearable device is worn. That is to say, in one situation, the image acquisition device can be arranged on the side of a single lens barrel of the eye-wearable device, for example, on the outer side of the left lens barrel of the eye-wearable device (the eye-wearable device can be opposite to the user's left eye when it is worn), as shown in FIG. 2A, in which the triangle represents the image acquisition device. In another case, it can be arranged inside the lens barrel of the eye-wearable device; as shown in FIG. 2B, it's inside the left lens barrel of the eye-wearable device, and the triangle represents the image acquisition device.

In another embodiment, considering that the brightness of the image capturing area of the image capturing device may be weak when the eye-wearable device is worn, in order to ensure that the image captured by the image capturing device has a good definition (for example, exceeding a preset definition threshold) so as to ensure the normal process of the subsequent determination of the wearing state of the eye-wearable device, the eye-wearable device can also be provided with a supplementary light source, which is configured to supplement light for the image capturing area of the image acquisition device. In an implementation, there may be one or more supplementary light sources. As shown in FIG. 2A and FIG. 2B, there may be one supplementary light source, and in order to ensure effective supplementary light for the image capturing area of the image acquisition device, the distance between the supplementary light source and the image acquisition device does not exceed a preset first distance. The circles shown in FIGS. 2A and 2B represent complementary light sources. In another implementation, when there is a plurality of supplementary light sources, the supplementary light sources can be used to supplement the light for the image capturing area of the image acquisition device.

In yet another embodiment, in the case where there is a plurality of image acquisition devices, in an implementation, the plurality of image acquisition devices may be configured such that when the eye-wearable device is worn, the plurality of image acquisition devices are all opposite to the left eye or the right eye of the user. That is to say, the plurality of image acquisition devices can all be arranged one the side of a single lens barrel of the eye-wearable device.

In another implementation, the plurality of image acquisition devices may be configured such that when the eye-wearable device is worn, at least one image acquisition device of the plurality of image acquisition devices is opposite to the left eye of the user and at least one image acquisition device is opposite to the right eye of the user.

Figure 2C:
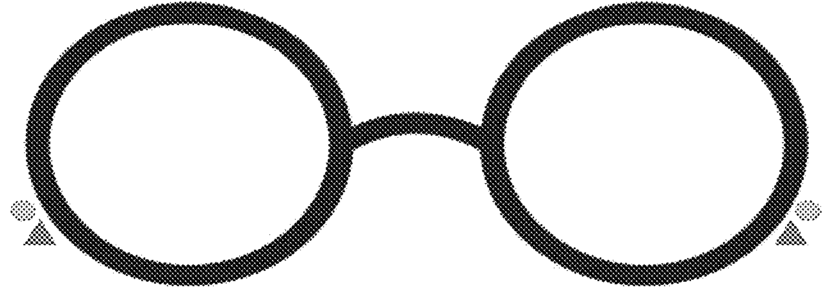

That is to say, the plurality of image acquisition devices can be respectively arranged on the sides of the two lens barrels of the eye-wearable device. As shown in FIG. 2C, there are two image acquisition devices, one of which is arranged on the outer side of the left lens barrel of the eye-wearable device and the other is arranged on the outer side of the right lens barrel of the eye-wearable device.

Figures 2D, 2E, 3:
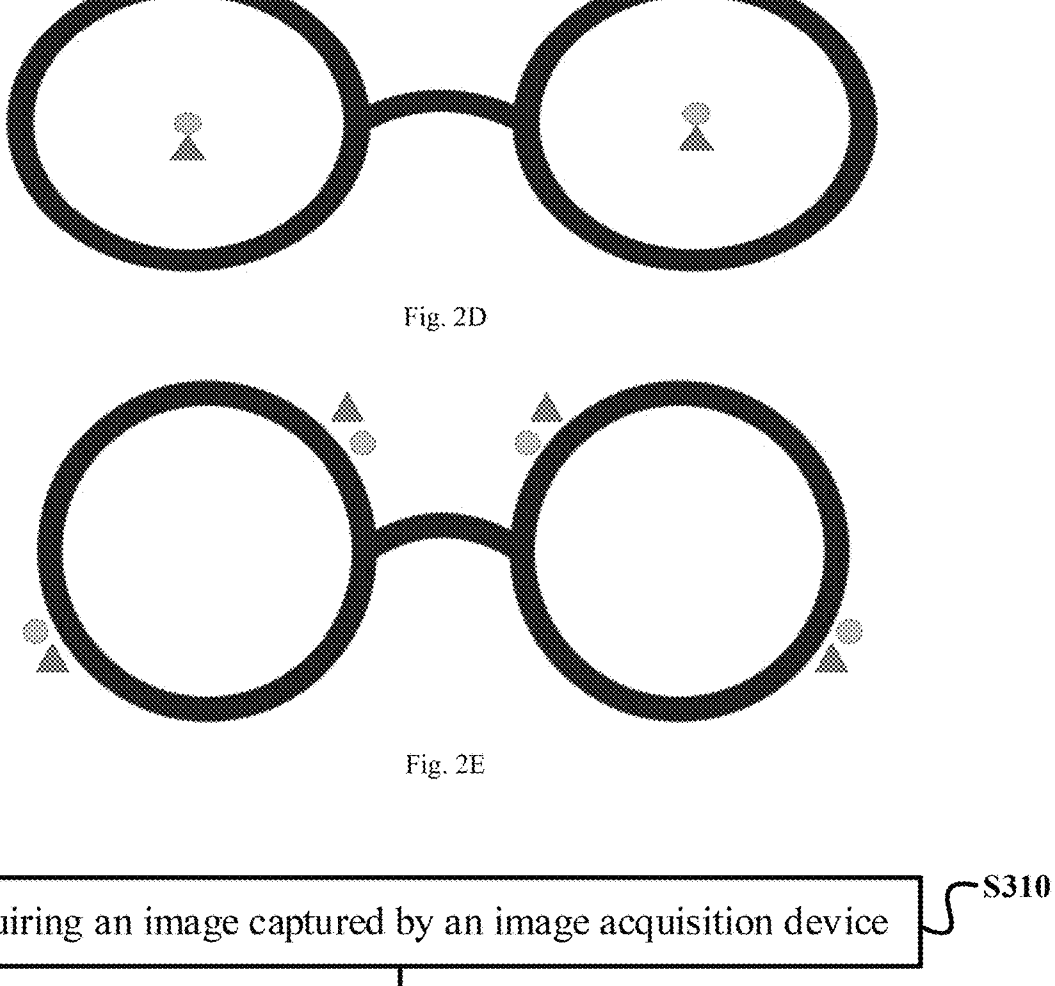
FIG. 3 is a flowchart of a method for determining a wearing state of an eye-wearable device provided by an embodiment.

In another implementation, as shown in FIG. 2D, there are two image acquisition devices, of which one image acquisition device is arranged inside the left lens barrel of the eye-wearable device, and the other image acquisition device is arranged inside the right lens barrel of the eye-wearable device. As shown in FIG. 2E, there can be four image acquisition devices, in which two image acquisition devices are respectively arranged on the outer side and the inner side of the left lens barrel of the eye-wearable device, and the other two image acquisition devices are respectively arranged on the outer side and the inner side of the right lens barrel of the eye-wearable device.

In order to ensure that the image captured by the image acquisition device has a good definition (for example, exceeding the preset definition threshold), the eye-wearable device is also provided with a supplementary light source; as shown in FIGS. 2C and 2D, two supplementary light sources can be provided to supplement the light in the image capturing areas of the two image acquisition devices, respectively, wherein the distance between the image acquisition device and its corresponding supplementary light source (i.e., the supplementary light source for supplementing the light of this device) does not exceed the first distance. As shown in FIG. 2E, there can be four supplementary light sources, which are respectively configured to supplement the light in the image capturing areas of four image acquisition devices.

It can be understood that the image acquisition device and the supplementary light source may or may not appear in pairs, as long as the brightness supplemented by the supplementary light source can meet the brightness required by the corresponding image acquisition device to capture images.

In an embodiment, the image acquisition device may be an imaging device based on light of any waveband. Considering that infrared light will not be detected by human eyes, and that it is not easy to cause harm to human eyes or to be influenced by visible light (light emitted by the eye-wearable device when it works), the image acquisition device can be an imaging device based on infrared light, such as an infrared camera. Accordingly, the supplementary light source can compensate infrared light for the image acquisition device, for example, it can be an infrared light emitting diode (LED). In yet another implementation, the supplementary light source can also be a local area of the display screen of the eye-wearable device, for example, the local area can be reused as a supplementary light source.

The image acquisition device and the supplementary light source can be started synchronously to capture images. After that, based on the images captured by the image acquisition device provided in the eye-wearable device, the subsequent process of determining the wearing state of the eye-wearable device is executed. Next, the process of determining the wearing state of the eye-wearable device is introduced.

FIG. 3 shows a flowchart of a method for determining a wearing state of an eye-wearable device in an embodiment of the present disclosure. The method can be realized by an object program, which can be installed on the eye-wearable device in the form of software development kit (SDK) or in the form of a system service of the operating system of the eye-wearable device. The eye-wearable device is provided with an image acquisition device, and the image acquisition device is configured to be opposite to the eyes of a user when the eye-wearable device is worn, as shown in FIG. 3, and the method includes the following steps S310-S320:

In step S310, an image captured by an image acquisition device is acquired. In this step, the image acquisition device can capture images at a certain frame rate, and the object program can get the images captured by the image acquisition device in real time. Next, in step S320, the wearing state of the eye-wearable device is determined according to the images.

Specifically, considering that the eye-wearable device has different wearing states, there is difference between image contents of the images captured by the image acquisition device. For example, when the eye-wearable device is worn on the user's eyes, the image content of the image captured by the image acquisition device may only include the user's eye area. For another example, when the eye-wearable device is not worn on the user's face, the image content of the image captured by the image acquisition device does not include the human face (i.e. the face), or the image content of the image captured by the image acquisition device includes the human face but does not include the eye area, or it includes not only the eye area but also other facial areas (such as nose, forehead, etc.). In view of this, in step S320, the object program can determine the wearing state of the eye-wearable device according to the imaging content of the image.

In an implementation, when there is only one image acquisition device, the object program can directly determine the wearing state of the eye-wearable device based on the images captured by the image acquisition device in step S320. In the case of a plurality of image acquisition devices, after acquiring the images captured by the plurality of image acquisition devices in the same image capturing cycle, the object program can, firstly, splice the plurality of images to obtain a spliced image, and then in step S320, determine the wearing state of the eye-wearable device at least according to the spliced image.

For the sake of clear layout, firstly, the process of determining a wearing state of an eye-wearable device under the condition that there is only one image acquisition device is introduced.

It can be understood that the eye-wearable device in the embodiment of the present disclosure can be a device that need to be worn on the eyes for use, such as VR helmet, VR glasses and smart glasses.

The process of wearing the eye-wearable device by the user generally includes the process of picking up the eye-wearable device for wearing by the user, and the process of wearing the eye-wearable device on the eyes by the user; for example, in the case where the eye-wearable device is a VR helmet (or VR glasses), it may also include the process of fastening the strap of the eye-wearable device. In addition, even if the eye-wearable device is worn on the eyes, when the wearing position of the eye-wearable device is not accurate (for example, it is not worn on a preset accurate wearing position), human eyes will be very easy to get tired. Accordingly, in the process of wearing the eye-wearable device, it may be necessary to determine whether the eye-wearable device is in the following states in turn, including, for example, determining whether the eye-wearable device is in a moving state (also referred to as determining whether the relative position between the eye-wearable device and the user's face is stable), determining whether the eye-wearable device is worn on the face, determining whether the eye-wearable device is worn on the eyes, and determining whether the wearing position of the eye-wearable device is correct after it's worn on the eyes.

Figures 4, 5:
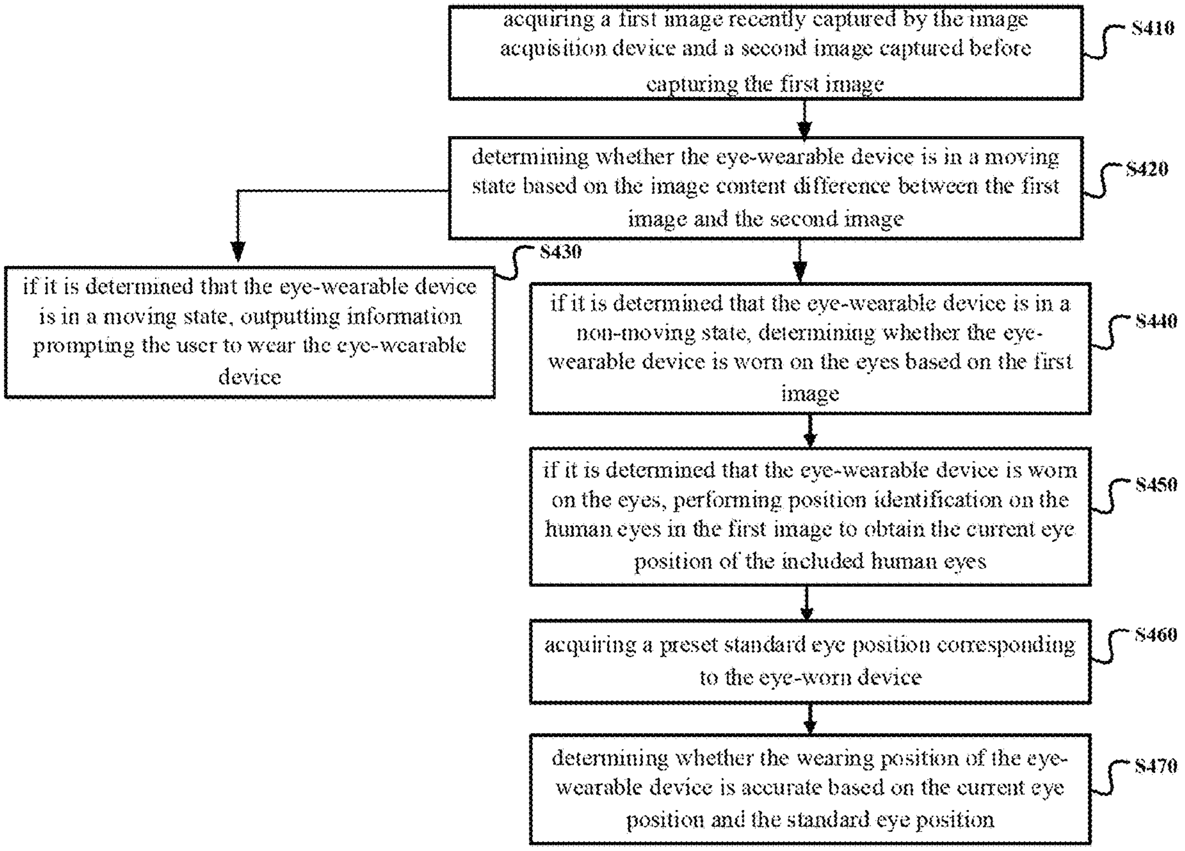
FIG. 4 is another flowchart of a method for determining a wearing state of an eye-wearable device provided by an embodiment.
FIG. 5 is another flowchart of a method for determining a wearing state of an eye-wearable device provided by an embodiment.

In view of the above situation, in an embodiment, as shown in FIG. 4, the method for determining a wearing state of an eye-wearable device may include the following steps:

In step S410, a first image recently captured by the image acquisition device and a second image captured before the first image are acquired. Specifically, the object program obtains the first image recently captured by the image acquisition device, and after determining that the first image does not belong to the first preset-number of frames (for example, M frames) captured by the image acquisition device in this workflow, it continues to obtain a second image captured by the image acquisition device before capturing the first image. In an implementation, the first image is the $K^{th}$ frame of image captured by the image acquisition device in this workflow, and correspondingly, the second image is the $(K-M)^{th}$ frame of image captured by the image acquisition device in this workflow. Here, the eye-wearable device is started at this time, which can trigger the image acquisition device to enter this workflow.

In an implementation, the value of the preset number M is related to the frame rate of the image acquisition device for capturing images, wherein the larger the frame rate is, the greater the value of M will be. In one situation, the value of M can be equal to the product of the frame rate and a specified value, such as 0.1. Accordingly, for example, if the frame rate of the image acquisition device for capturing images is 60, the value of M can be 6.

After the object program acquires the first image and the second image, in step S420, it is determined whether the eye-wearable device is in a moving state based on the image content difference between the first image and the second image. In this step, the object program can determine whether the eye-wearable device has a large displacement (for example, whether it exceeds a preset displacement threshold) based on the image content difference between the first image and the second image. If it is determined that the eye-wearable device has a large displacement (that is, it is determined that the displacement of the eye-wearable device exceeds the preset displacement threshold), the eye-wearable device is determined to be in a moving state; if it is determined that the eye-wearable device does not have a large displacement (that is, it is determined that the displacement of the eye-wearable device does not exceed the preset displacement threshold), the eye-wearable device is determined to be in a non-moving state.

Next, in step S430, when it is determined that the eye-wearable device is in a moving state, information prompting the user to wear the eye-wearable device is output.

In this step, the object program can output information representing the moving state of the eye-wearable device to a system-related control program of the eye-wearable device when it is determined that the eye-wearable device is in the moving state. The information representing the moving state of the eye-wearable device can instruct the eye-wearable device to output information prompting the user to wear the eye-wearable device. Here, the information can be voice-based prompt information, for example, it can be a voice-based prompt for the user to wear an eye-wearable device (e.g., fastening the strap of the eye-wearable device); the prompt information can also be brightness-based prompt information, for example, it can prompt the user to wear the eye-wearable device (e.g., fastening the strap of the eye-wearable device) by flashing an indicator light.

In an implementation, in order to improve the user's experience and avoid frequently prompting the user to wear eye-wearable device which may lead to negative emotions of the user, or in order to avoid misjudgment, after receiving the information indicating the moving state of the eye-wearable device, the system-related control program also needs to continue to determine whether the number of times that the eye-wearable device is determined to be in a moving state exceeds a preset number threshold (that is, whether the number of times that the information indicating a moving state of the eye-wearable device is received within a first preset duration exceeds the preset number threshold), and if the determination result is "yes", the eye-wearable device is controlled to output information prompting the user to wear the eye-wearable device, for example, a voice prompting the user to fasten the strap of the eye-wearable device. The first preset duration can be set according to experience.

In another embodiment, if the first image belongs to the first preset number of frames of images (for example, M frames) captured by the image acquisition device in this workflow, that is, the first image is the first to M frames of images captured by the image acquisition device in this workflow, the object program can directly determine that the eye-wearable device is in a moving state based on the first image.

In an implementation, after the object program outputs the information representing the moving state of the eye-wearable device to the system-related control program of the eye-wearable device, the first image can be stored in a historical frame queue for storing the images historically captured by the image acquisition device. After that, it continues to acquire new images captured by the image acquisition device, and executes the next round of determination flow of the wearing state of the eye-wearable device for the new images captured by the image acquisition device.

In another embodiment, as shown in FIG. 4, the method for determining a wearing state of an eye-wearable device may further include: in step S440, if it is determined that the eye-wearable device is in a non-moving state, determining whether the eye-wearable device is worn on the eyes based on the first image.

In an implementation, the object program can detect and identify the first image to determine whether it only contains the eye area, and if it is determined that it only contains the eye area, the eye-wearable device is determined to be worn on the eyes.

In one situation, there may be cases where the eye-wearable device is worn in an upside-down manner. For example, when the eye-wearable device is correctly worn, its left lens barrel is opposite to the user's left eye and its right lens barrel is opposite to the user's right eye, and the upper eyelid of the human eye is above the lower eyelid in the image captured by the image acquisition device for the eye area. When the eye-wearable device is worn in an upside-down manner, the left lens barrel is opposite to the user's right eye and the right lens barrel is opposite to the user's left eye, and the lower eyelid of the human eye is above the upper eyelid in the image captured by the image acquisition device for the eye area.

In view of this, when the object program determines that the first image only contains the eye area, it can continue to determine whether the form of the included eye area is accurate, for example, whether the upper eyelid of the human eye in the eye area in the first image is above the lower eyelid. If it is determined that the upper eyelid of the human eye in the eye area in the first image is above the lower eyelid, the eye-wearable device is determined to be worn on the eyes; if it is determined that the upper eyelid of the human eye in the eye area in the first image is not above the lower eyelid (the upper eyelid is below the lower eyelid), the eye-wearable device is determined to be not worn on the eyes (the wearing position of the eye-wearable device is wrong and the wearing position is greatly deviated).

In yet another implementation, the user may not wear the eye-wearable device on the eyes for a long time after starting the eye-wearable device, for example, the eye-wearable device is placed on the surface of an object, it can be considered that the user is not ready to use the eye-wearable device at this time, and information indicating to control the eye-wearable device to be in a standby state can be output to save the power consumption of the eye-wearable device.

Specifically, if it is determined that the eye-wearable device is not worn on the eyes, it can continue to determine whether the eye-wearable device is worn on the user's face (for example, determining whether the first image contains the user's face), and if it is determined that the eye-wearable device is not worn on the user's face (for example, the first image does not contain the user's face), information indicating that the eye-wearable device is not worn on the user's face can be output. The system-related control program of the eye-wearable device obtains the information indicating that the eye-wearable device is not worn on the user's face, and then continues to determine whether the number of times that the eye-wearable device is determined to be not worn on the user's face exceeds a preset number threshold (that is, whether the number of times that the information indicating that the eye-wearable device is not worn on the user's face is continuously received exceeds the preset number threshold). If the determination result is "yes", the eye-wearable device can be controlled to be in a standby state, so as to save the electricity consumption of the eye-wearable device.

In yet another implementation, if the object program determines that the eye-wearable device is not worn on the eyes, but determines that the eye-wearable device is worn on the user's face (for example, on the user's forehead), information representing that the eye-wearable device is worn on the user's face but not on the eyes is output. The system-related control program of the eye-wearable device obtains the information indicating that the eye-wearable device is worn on the user's face but not on the eyes, and then continues to determine whether the number of times that the eye-wearable device is determined to be worn on the user's face but not on the eyes exceeds the preset number threshold (that is, whether the number of times that the information indicating that the eye-wearable device is worn on the user's face but not on the eyes is continuously received exceeds the preset number threshold). If the determination result is "yes", the eye-wearable device can be controlled to output information which instructs the user to wear the eye-wearable device at the preset accurate wearing position, in order to improve the user's experience; for example, the eye-wearable device can be controlled to output an instruction voice, to instruct the user to wear the eye-wearable device at the preset accurate wearing position through voice.

In an implementation, after the object program outputs information indicating that the eye-wearable device is not worn on the eyes (for example, information indicating that the eye-wearable device is not worn on the user's face, and information indicating that the eye-wearable device is worn on the user's face but not on the eyes) to the system-related control program of the eye-wearable device, the first image can be stored in a historical frame queue for storing images historically captured by the image acquisition device. After that, it can continue to acquire new images captured by the image acquisition device, and execute the next round of determination flow of the wearing state of the eye-wearable device for the new images captured by the image acquisition device.

In yet another embodiment, the embodiment of the present disclosure can also determine whether the eye-wearable device is worn on the eyes through a pre-trained state classification model to ensure the accuracy of the determination result. Specifically, in step S440, it may include inputting the first image into a state classification model, and determining the current state category of the eye-wearable device, wherein the current state category represents whether the eye-wearable device is worn on the eyes, and the state classification model is a model trained in advance based on sample images and their corresponding state category labels.

Here, the state category labels may include, for example, a label indicating that the eye-wearable device is not worn on the user's face, a label indicating that the eye-wearable device is close to the user's face but not properly worn (for example, the strap is not fastened), a label indicating that the eye-wearable device is worn on the user's face but not on the eyes, and a label indicating that the eye-wearable device is worn on the user's eyes. The first three state category labels all indicate that the eye-wearable device is not worn on the eyes. In the process of training the state classification model, a plurality of sample images can be obtained, and each sample image is labeled with an aforementioned state category label according to the imaging content of the sample image. After that, based on the sample images and their state category labels, the state classification model is trained, and it is determined that the training of the state classification model is completed when the state classification model reaches a preset convergence condition. Then the trained state classification model is used to determine the state category corresponding to the input image.

Here, the preset convergence condition may include, but is not limited to, the number of times of iterative training of the state classification model exceeds a preset number threshold, and the predicted loss corresponding to the state classification model is lower than a preset loss threshold. The predicted loss corresponding to the state classification model is determined based on the state category labels of the sample images and the state categories predicted by the state classification model for the sample images.

In this implementation, the object program inputs the first image into the state classification model to obtain the output result of the state classification model which may include the probability that the first image corresponds to each state category label, and determines the current state category of the eye-wearable device based on the probability that the first image corresponds to each state category label in the output result; the current state category can represent whether the eye-wearable device is worn on the eyes.

It can be understood that the accuracy of the determination results can be ensured, to some extent, by determining the current state category of the eye-wearable device through the state classification model, that is, determining whether the eye-wearable device is worn on the eyes.

After the current state category of the eye-wearable device is determined in the above way, that is, after determining whether the eye-wearable device is worn on the eyes of the user, different subsequent actions can be performed according to different wearing states of the eye-wearable device represented by the current state category.

In an embodiment, if the current state category indicates that the eye-wearable device is not worn on the face, information that instructs to control the eye-wearable device to be in a standby state is output. Specifically, if the current state category indicates that the eye-wearable device is not worn on the face, the object program can output the current state category (i.e., information indicating that the eye-wearable device is not worn on the face) to the system-related control program of the eye-wearable device, and the current state category can instruct to control the eye-wearable device to be in a standby state.

After the system-related control program of the eye-wearable device obtains the current state category, it is determined whether the eye-wearable device has been in the state of not being worn on the face for a certain period of time based on the previously obtained state categories (which can be referred to as historical state categories), that is, determining whether the number of state categories, among the historical state categories, continuously representing that the VR is not worn on the face exceeds a certain number. If so, it is determined that the eye-wearable device has been in a state of not being worn on the face for a certain period of time, and then the system-related control program can control the eye-wearable device to be in a standby state to save the power consumption of the eye-wearable device.

In yet another embodiment, if the current state category indicates that the eye-wearable device is worn on the face but not on the eyes, information instructing the user to wear the eye-wearable device at the preset accurate wearing position is output, for example, an instruction voice is output to instruct the user to wear the eye-wearable device at the preset accurate wearing position through voice. Specifically, if the current state category indicates that the eye-wearable device is worn on the face but not on the eyes, the object program can output the current state category (i.e., information indicating that the eye-wearable device is worn on the face but not on the eyes) to the system-related control program of the eye-wearable device, and the current state category can instruct the user to wear the eye-wearable device at the preset accurate wearing position through voice.

After the system-related control program of the eye-wearable device obtains the current state category, it is determined whether the eye-wearable device has been in the state of being worn on the face but not on the eyes for a certain period of time based on the obtained historical state categories, that is, determining whether the number of state categories, among the historical state categories, continuously representing that the VR is worn on the face but not on the eyes exceeds a certain number. If so, it is determined that the eye-wearable device has been in a state of being worn on the face but not on the eyes for a certain period of time. Then, the system-related control program can control the eye-wearable device to output information instructing the user to wear the eye-wearable device at the preset accurate wearing position, for example, controlling the eye-wearable device (such as controlling the microphone of the eye-wearable device) to output instruction voice to instruct the user to wear the eye-wearable device at the preset accurate wearing position through voice, so as to improve the user's experience.

In yet another embodiment, if the current state category indicates that the eye-wearable device is close to the user's face but is not properly worn (for example, the strap is not fastened), the object program can directly output the current state category to the system-related control program of the eye-wearable device. In an implementation, after the system-related control program of the eye-wearable device receives the current state category, the current state may be considered as a transitional state, and in order to avoid the situation that the prompting information is sent too frequently, it is unnecessary to perform the prompting task for this state. In another implementation, after the system-related control program of the eye-wearable device receives the current state category, it can determine whether the eye-wearable device has been in a state of being close to the user's face but not properly worn for a certain period of time based on the previously obtained historical state categories, that is, determining whether the number of state categories, among the historical state categories, continuously representing that the VR is close to the user's face but not properly worn exceeds a certain number. If so, it is determined that the eye-wearable device has been in a state of being close to the user's face but not properly worn for a certain period of time. At this time, the system-related control program can control the eye-wearable device to prompt the user to properly wear the eye-wearable device through voice (or by flashing the indicator light) (for example, prompting the user to fasten the strap of the eye-wearable device through voice), so as to improve the user's experience.

In yet another embodiment, if the current state category indicates that the eye-wearable device is worn on the eyes, the object program can continue to determine whether the position of the user's eyes is accurate (that is, determining whether the wearing position of the eye-wearable device is appropriate), in order to guarantee the user's usage experience and avoid the situation that the user's wearing position is not suitable enough, which situation may cause the human eyes to easily get tired. Correspondingly, the method can also include: in step S450, if it is determined that the eye-wearable device is worn on the eyes, position identification is performed on the human eyes in the first image to obtain the current eye position of the included human eyes.

In an implementation, if the current state category indicates that the eye-wearable device is worn on the eyes, the object program performs position identification on the human eyes in the first image, which can directly detect the position of the pupil of the human eyes in the first image and determine the position of the pupil as the current eye position.

In another implementation, in step S450, it can specifically include: performing position identification on human eyes in the first image to determine key point positions of several eye key points corresponding to the included human eyes; and determining the current eye position based on the key point positions. In this implementation, the object program can use a preset key point detection algorithm to identify the position of human eyes in the first image and determine the key point positions of several eye key points corresponding to the included human eyes. Here, the eye key points can include, but are not limited to, several equal division points of the upper and lower eyelids of human eyes (such as bisectors, trisections, etc.), canthus key points, eye tail key points, etc. Then the object program determines the current eye position of the included human eyes based on the key point positions of several eye key points. For example, a central position of key point positions of several eye key points can be determined as the current eye position.

Here, the preset key point detection algorithm can be any key point detection algorithm that can detect key points in an image in related technologies, and is not limited here.

Next, in step S460, a preset standard eye position corresponding to the eye-wearable device is obtained, wherein the standard eye position is determined based on the condition that the eye-wearable device is at a preset accurate wearing position. The preset standard eye position can be pre-stored in a preset storage space of the eye-wearable device. After the object program determines the current eye position in step S450, it can read the standard eye position from the preset storage space.

It can be understood that the step flow shown in FIG. 4 is only a schematic flow. In another implementation, step S460 can also be executed before step S450 (that is, the object program reads the standard eye position from the preset storage space after determining that the eye-wearable device is worn on the eyes), or can be executed in parallel with step S450.

After the object program obtains the current eye position and the standard eye position, in step S470, it is determined whether the wearing position of the eye-wearable device is accurate based on the current eye position and the standard eye position.

In an implementation, under the condition that the current eye position is in the same coordinate system as the standard eye position, the step S470 can specifically include: if it is determined that the distance between the standard eye position and the current eye position in any specified direction exceeds a preset second distance in the specified direction, the wearing position of the eye-wearable device is determined to be inaccurate; if it is determined that the distance between the standard eye position and the current eye position in each specified direction does not exceed the preset second distance in the specified direction, the wearing position of the eye-wearable device is determined to be accurate. The second distance is set according to experience. In an implementation, the specified direction may include, but is not limited to, a horizontal direction and a vertical direction. The preset second distance in the horizontal direction may be equal to or different from the preset second distance in the vertical direction.

In this implementation, under the condition that the wearing position of the eye-wearable device is determined to be inaccurate relative to the preset accurate wearing position, the eye-wearable device may be in the following wearing position error states:

First error state: if it is determined that the standard eye position is above the current eye position, and that the distance between the standard eye position and the current eye position in the vertical direction exceeds the preset second distance in the vertical direction, it can be determined that the wearing position of the eye-wearable device is relatively lower (at this time, the wearing position of the eye-wearable device needs to be adjusted upwardly).

Second error state: if it is determined that the standard eye position is below the current eye position, and that the distance between the standard eye position and the current eye position in the vertical direction exceeds the preset second distance in the vertical direction, it can be determined that the wearing position of the eye-wearable device is relatively upper (at this time, the wearing position of the eye-wearable device needs to be adjusted downwardly).

Third error state: if it is determined that the standard eye position is at the left side of the current eye position, and that the distance between the standard eye position and the current eye position in the horizontal direction exceeds the preset second distance in the horizontal direction, it can be determined that the wearing position of the eye-wearable device is deviated to the right side (at this time, the wearing position of the eye-wearable device needs to be adjusted to the left).

Fourth error state: if it is determined that the standard eye position is at the right side of the current eye position, and that the distance between the standard eye position and the current eye position in the horizontal direction exceeds the preset second distance in the horizontal direction, it can be determined that the wearing position of the eye-wearable device is deviated to the left side (at this time, the wearing position of the eye-wearable device needs to be adjusted to the right).

After the object program determines the wearing position error state, it can output the wearing position error state to the system-related control program of the eye-wearable device, and the system-related control program executes corresponding actions according to the received wearing position error state to help the user adjust the eye-wearable device to the preset accurate wearing position. Specifically, the system-related control program receives the wearing position error state, and if it is determined that the object program has continuously output wearing position error state for many times (for example, more than a certain number of times), the system-related control program can control the eye-wearable device to guide the user to wear the eye-wearable device at the preset accurate wearing position through UI screen and/or voice.

In another implementation, after the object program determines that the wearing position of the eye-wearable device is accurate, it can output the information indicating that the wearing position of the eye-wearable device is accurate to the system-related control program of the eye-wearable device. After the system-related control program receives the information indicating that the wearing position of the eye-wearable device is accurate, it will no longer output relevant prompting information which prompts the user to wear the eye-wearable device accurately.

In another implementation, if the current eye position is in a coordinate system different from that of the standard eye position, firstly, it can convert the current eye position and the standard eye position to the same coordinate system, and then it can be determined whether the wearing position of the eye-wearable device is accurate based on the current eye position and the standard eye position which have been converted to the same coordinate system.

In the following, the process of determining the wearing state of the eye-wearable device in the case of a plurality of image acquisition devices is introduced.

As shown in FIG. 5, the method for determining a wearing state of an eye-wearable device may include the following steps:

In step S510, a plurality of first images recently captured by a plurality of image acquisition devices are acquired, and a corresponding historical image is obtained, wherein the historical image is an image obtained by splicing based on a second image captured by the plurality of image acquisition devices, and wherein the second image is an image captured by the plurality of image acquisition devices before capturing the first image.

It can be understood that, the plurality of image acquisition devices can capture the environment from different angles, and based on a plurality of first images captured by the plurality of image acquisition devices, an image with more information can be obtained by splicing, which can improve the accuracy of the state determination result to a certain extent. For the process of acquiring a plurality of first images, reference can be made to the above-mentioned process of acquiring the latest first image captured by an image acquisition device, and the details are not repeated here.

In this step, the object program can acquire images from the historical frame queue stored in a specified storage space of the eye-wearable device. The historical frame queue is stored with a plurality of images captured by a plurality of image acquisition devices in each historical capturing cycle, and a spliced image corresponding to each historical capturing cycle obtained by splicing. For example, if the first images are the $K^{th}$ frames of images captured by the plurality of image acquisition devices in this workflow, the corresponding historical image is the image obtained by splicing the $(K-M)^{th}$ frames of images captured by the plurality of image acquisition devices in this workflow.

After the object program obtains a plurality of first images, in step S520, the plurality of first images are spliced to obtain the target image.

It can be understood that in one situation, the plurality of image acquisition devices are configured to be opposite to the user's left eye or right eye when the eye-wearable device is worn; for example, if the plurality of image acquisition devices are opposite to the user's left eye, images are captured for the user's left eye when the eye-wearable device is worn. After the object program acquires a plurality of first images, it can directly splice the plurality of first images based on the positional relationship between the plurality of image acquisition devices to obtain the target image.

In yet another case, the plurality of image acquisition devices are configured such that at least one image acquisition device is opposite to the user's left eye and at least one image acquisition device is opposite to the user's right eye when the eye-wearable device is worn, that is, the plurality of image acquisition devices respectively capture images for the user's left eye and right eye when the eye-wearable device is worn. For the sake of clarity, hereinafter, the image acquisition device that captures images for the user's left eye when the eye-wearable device is worn is referred to as the left-eye image acquisition device, and the image acquisition device that captures images for the user's right eye when the eye-wearable device is worn is referred to as the right-eye image acquisition device.

During image splicing, the first images newly captured by all of the left-eye image acquisition devices can be spliced according to the positional relationship between all of the left-eye image acquisition devices to obtain a first spliced image. Similarly, the first images newly captured by all of the right-eye image acquisition devices are spliced according to the positional relationship between all of the right-eye image acquisition devices to obtain a second spliced image. Then, based on a specified splicing mode (that is, a splicing mode set according to the position relationship between the left and right eyes), the first spliced image and the second spliced image are spliced to obtain the target image.

Then, in step S530, the wearing state of the eye-wearable device is determined according to the target image and the historical image.

Specifically, first of all, it can be determined whether the eye-wearable device is in a moving state according to the image content difference between the target image and the historical image. When it is determined that the eye-wearable device is in a moving state, information prompting the user to properly wear the eye-wearable device (for example, fastening the strap of the eye-wearable device) is output, for example, an instruction voice is output to remind the user to properly wear the eye-wearable device through voice. For the process of determining whether the eye-wearable device is in a moving state, reference can be made to the aforementioned process of determining whether the eye-wearable device is in a moving state based on the image content difference between the first image and the second image. For the process of outputting the information prompting the user to properly wear the eye-wearable device when it is determined that the eye-wearable device is in a moving state, reference can be made to the process of outputting the information prompting the user to properly wear the eye-wearable device when it is determined that the eye-wearable device is in a moving state in the previous embodiment, which is not repeated here.

Then, if it is determined that the eye-wearable device is in a non-moving state, determining whether the eye-wearable device is worn on the eyes based on the target image. For the process of determining whether the eye-wearable device is worn on the eyes based on the target image, reference can be made to the process of determining whether the eye-wearable device is worn on the eyes based on the first image in the flow shown in FIG. 4, which is not repeated here.

Next, if it is determined that the eye-wearable device is not worn on the eyes, for the actions performed by the object program, reference can be made to the actions performed by the object program when it is determined that the eye-wearable device is not worn on the eyes based on the first image in the previous embodiment, and the details are not repeated here.

If it is determined that the eye-wearable device is worn on the eyes, the position identification of human eyes in the target image is further performed to obtain the current eye position of the included human eyes, and a preset standard eye position corresponding to the eye-wearable device is obtained, which is determined based on the condition that the eye-wearable device is at the preset accurate wearing position. Then, based on the current eye position and the standard eye position, it is determined whether the wearing position of the eye-wearable device is accurate.

In the case where the target image only includes one human eye, for the process of determining whether the wearing position of the eye-wearable device is accurate based on the current eye position and the standard eye position, reference can be made to the process of determining whether the wearing position of the eye-wearable device is accurate based on the current eye position and the standard eye position in the flow shown in FIG. 4, which will not be described here again.

In the case where the target image includes two human eyes (that is, the left eye and the right eye of the user), the current eye position includes a current left-eye position and a current right-eye position; and the standard eye position includes a standard left-eye position and a standard right-eye position. Accordingly, under the condition that the current eye position and the standard eye position are in the same coordinate system, in an implementation, the process of determining whether the wearing position of the eye-wearable device is accurate based on the current eye position and the standard eye position may include:

If the difference between, the distance between the current left-eye position and the standard left-eye position, and, the distance between the current right-eye position and the standard right-eye position exceeds a preset distance difference, it is determined that the wearing position of the eye-wearable device is inaccurate.

In an exemplary case, under the condition that the current left-eye position and the current right-eye position are both above (or below) the standard left-eye position and the standard right-eye position respectively, if it is determined that the difference between, the distance between the current left-eye position and the standard left-eye position, and, the distance between the current right-eye position and the standard right-eye position does not exceed the preset distance difference, it can continue to judge whether the vertical distance between the current left-eye position and the standard left-eye position and the vertical distance between the current right-eye position and the standard right-eye position both exceed the preset second distance in the vertical direction; if so, it is determined that the wearing position of the eye-wearable device is relative lower (or upper), and the wearing position of the eye-wearable device can be adjusted upwardly (or downwardly); if it is judged that the vertical distance between the current left-eye position and the standard left-eye position and the vertical distance between the current right-eye position and the standard right-eye position both do not exceed the preset second distance in the vertical direction, it is determined that the wearing position of the eye-wearable device is accurate.

Under the condition that the current left-eye position and the current right-eye position are both above (or below) the standard left-eye position and the standard right-eye position respectively, if it is determined that the difference between, the difference between the current left-eye position and the standard left-eye position, and, the difference between the current right-eye position and the standard right-eye position, exceeds the preset distance difference, it can also continue to judge whether the vertical distance between the current left-eye position and the standard left-eye position and the vertical distance between the current right-eye position and the standard right-eye position both exceed the preset second distance in the vertical direction; if so, it is determined that the wearing position of the eye-wearable device is tilted and relatively lower (or upper), that is, the wearing position of the eye-wearable device is not accurate, and it is necessary to adjust the eye-wearable device to a horizontal wearing state and adjust the wearing position of the eye-wearable device upwardly (or downwardly).

If it is judged that the distance between the current left-eye position and the standard left-eye position in the vertical direction and the distance between the current right-eye position and the standard right-eye position in the vertical direction both do not exceed the preset second distance in the vertical direction, it is determined that the eye-wearable device is tilted, that is, the wearing position of the eye-wearable device is inaccurate. At this time, it is necessary to adjust the eye-wearable device to a horizontal wearing state.

In another exemplary case, if the current left-eye position is below the standard left-eye position and the current right-eye position is above the standard right-eye position, or if the current left-eye position is above the standard left-eye position and the current right-eye position is below the standard right-eye position, it can be directly determined that the eye-wearable device is worn in a tilted manner, that is, the wearing position of the eye-wearable device is inaccurate. At this time, it is necessary to adjust the eye-wearable device to a horizontal wearing state.

In yet another exemplary case, under the condition that the current left-eye position and the current right-eye position are both at the left (or right) side of the standard left-eye position and the standard right-eye position, it is determined that the wearing position of the eye-wearable device is deviated to the right (or to the left), that is, the wearing position of the eye-wearable device is inaccurate, and so on.

When it is determined that the wearing position of the eye-wearable device is inaccurate, the object program sends information representing that the wearing position of the eye-wearable device is inaccurate to the system-related control program. If the system-related control program determines that the eye-wearable device is in a state of being at the inaccurate wearing position for a certain period of time, it instructs the user to wear the eye-wearable device at the preset accurate wearing position through UI screen and/or voice.

In the above process, the wearing state of the eye-wearable device can be accurately determined through the imaging content of the image. In addition, whether the wearing position of the eye-wearable device is appropriate (at the preset accurate wearing position) or not can be recognized when the eye-wearable device is worn on the eyes, and the user can be instructed to wear the eye-wearable device at the appropriate position when the wearing position of the eye-wearable device is determined to be inappropriate, which can better improve the user's experience and better protect the user's vision.

The foregoing has described specific embodiments of the present disclosure, and other embodiments are within the scope of the appended claims. In some cases, the actions or steps recited in the claims may be performed in an order different from that in the embodiments, and still achieve the desired results. In addition, the processes depicted in the drawings do not have to be in the specific order as shown or in a continuous order to achieve the desired results. In some embodiments, multitasking and parallel processing are also possible or may be advantageous.

Figure 6:
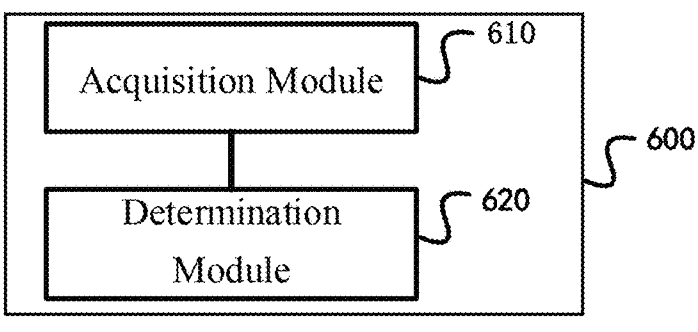
FIG. 6 is a schematic block diagram of an apparatus for determining a wearing state of an eye-wearable device provided by an embodiment.

Corresponding to the above-mentioned method embodiments, an embodiment of the present disclosure provides an apparatus 600 for determining a wearing state of an eye-wearable device, the eye-wearable device is provided with an image acquisition device, and the image acquisition device is configured to be opposite to the user's eyes when the eye-wearable device is worn. A schematic block diagram of the apparatus is shown in FIG. 6, including:

- an acquisition module 610, configured to acquire an image captured by the image acquisition device; and
- a determination module 620, configured to determine a wearing state of the eye-wearable device according to the image.

In an alternative embodiment, the eye-wearable device is further provided with a supplementary light source, and the supplementary light source is configured to supplement light for an image capturing area of the image acquisition device.

In an alternative embodiment, when there is one supplementary light source, the distance between the supplementary light source and the image acquisition device does not exceed a preset first distance.

In an alternative embodiment, when there is one image acquisition device, the image acquisition device is configured to be opposite to the left eye or the right eye of the user when the eye-wearable device is worn; alternatively, when there are at least two image acquisition devices, the image acquisition devices are configured such that at least one image acquisition device is opposite to the user's left eye and/or at least one image acquisition device is opposite to the user's right eye when the eye-wearable device is worn.

In an alternative embodiment, the image includes a first image recently captured by the image acquisition device and a second image captured by the image acquisition device before capturing the first image; and the determination module 620 includes:

- a first determination unit (not shown in the figure), configured to determine whether the eye-wearable device is in a moving state based on an image content difference between the first image and the second image; and
- a first output unit (not shown in the figure), configured to output information prompting the user to wear the eye-wearable device when it is determined that the eye-wearable device is in a moving state.

In an alternative embodiment, the determination module 620 further includes:

a second determination unit (not shown in the figure), configured to determine whether the eye-wearable device is worn on the eyes based on the first image when it is determined that the eye-wearable device is in a non-moving state.

In an alternative embodiment, the second determination unit is specifically configured to input the first image into a state classification model, and determine a current state category of the eye-wearable device, wherein the current state category represents whether the eye-wearable device is worn on the eyes, and the state classification model is a model trained in advance based on sample images and their corresponding state category labels.

In an alternative embodiment, the determination module 620 further includes:

a second output unit (not shown in the figure), configured to output information instructing to control the eye-wearable device to be in a standby state if the current state category indicates that the eye-wearable device is not worn on the face; and a third output unit (not shown in the figure), configured to output information instructing the user to wear the eye-wearable device at a preset accurate wearing position if the current state category indicates that the eye-wearable device is worn on the face but not on the eyes.

In an alternative embodiment, the determination module 620 further includes:

an identification unit (not shown in the figure), configured to perform position identification on human eyes in the first image if the current state category indicates that the eye-wearable device is worn on the eyes, to obtain the current eye position of the included human eyes;

an acquisition unit (not shown in the figure), configured to acquire a preset standard eye position corresponding to the eye-wearable device, wherein the standard eye position is determined based on the condition that the eye-wearable device is at a preset accurate wearing position; and a third determination unit (not shown in the figure), configured to determine whether the wearing position of the eye-wearable device is accurate based on the current eye position and the standard eye position.

In an alternative embodiment, the identification unit is specifically configured to perform position identification on human eyes in the first image to determine key point positions of several eye key points corresponding to the included human eyes; and determine the current eye position based on the key point positions.

In an alternative embodiment, the third determination unit is specifically configured to determine that the wearing position of the eye-wearable device is inaccurate if it is determined that a distance between the standard eye position and the current eye position in any specified direction exceeds a preset second distance in the specified direction; and if it is determined that the distance between the standard eye position and the current eye position in each specified direction does not exceed the second distance in the specified direction, it is determined that the wearing position of the eye-wearable device is accurate.

In an alternative embodiment, the current eye position includes a current left-eye position and a current right-eye position; the standard eye position includes a standard left-eye position and a standard right-eye position;

the third determination unit is specifically configured to determine that the wearing position of the eye-wearable device is inaccurate if it is determined that a difference between, a distance between the current left-eye position and the standard left-eye position, and, a distance between the current right-eye position and the standard right-eye position exceeds a preset distance difference.

In an alternative embodiment, there are a plurality of the image acquisition devices and a plurality of the first images; the determination module 620 is specifically configured to: splice the plurality of first images to obtain a target image; and determine the wearing state of the eye-wearable device at least according to the target image.

The above-mentioned apparatus embodiment corresponds to the method embodiment, and the detailed description can be found in the description of the corresponding part of the method embodiment, which is not repeated here. The apparatus embodiment is obtained based on the corresponding method embodiment, and has the same technical effect as the corresponding method embodiment. For details, reference can be made to the corresponding method embodiment.

Figure 7:
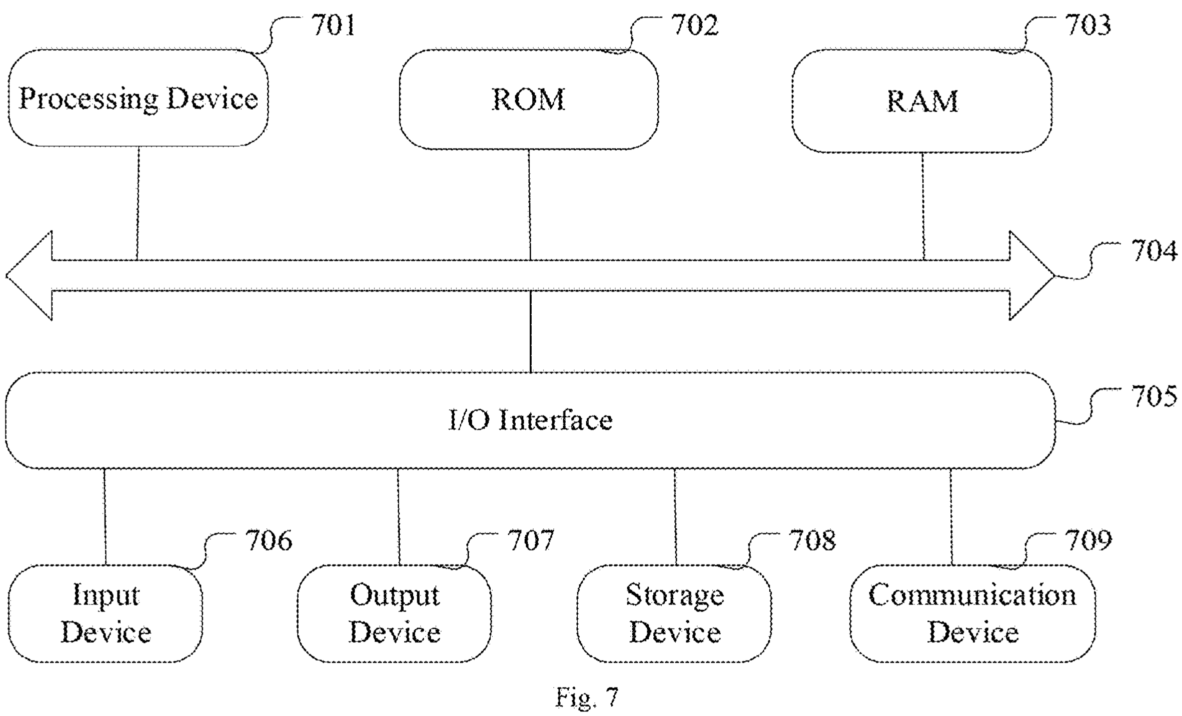
FIG. 7 is a schematic block diagram of an eye-wearable device provided by an embodiment.

Referring now to FIG. 7, there is shown a schematic structural diagram of an eye-wearable device 700 suitable for implementing the embodiment of the present disclosure. The eye-wearable device shown in FIG. 7 is just an example, and should not bring any limitation to the function and application scope of the embodiment of the present disclosure.

As shown in FIG. 7, an eye-wearable device 700 may include a processing device (such as a central processing unit, a graphics processor, etc.) 701, which may perform various appropriate actions and processes according to a program stored in a read-only memory (ROM)702 or a program loaded from a storage device 708 into a random-access memory (RAM)703. In the RAM 703, various programs and data required for the operation of the eye-wearable device 700 are also stored. The processing device 701, the ROM 702 and the RAM 703 are connected to each other through a bus 704. An input/output (I/O) interface 705 is also connected to the bus 704.

Generally, the following devices can be connected to the I/O interface 705: an input device 706 including, for example, a touch screen, a touch pad, a keyboard, a mouse, etc.; an output device 707 including, for example, a liquid crystal display (LCD), a speaker, a vibrator, etc.; a storage device 708 such as a magnetic tape, a hard disk, etc.; and a communication device 709. The communication device 709 may allow the eye-wearable device 700 to have wireless or wired communication with other devices to exchange data. Although FIG. 7 shows an eye-wearable device 700 with various devices, it should be understood that it is not required to implement or have all the devices as shown. More or fewer devices may alternatively be implemented or provided. Each block shown in FIG. 7 may represent one device or a plurality of devices as required.

In particular, according to an embodiment of the present disclosure, the process described above with reference to the flowchart can be implemented as a computer software program. For example, an embodiment of the present disclosure includes a computer program product, which includes a computer program carried on a computer-readable medium, and the computer program contains program codes for executing the method shown in the flowchart. In such an embodiment, the computer program can be downloaded and installed from the network through the communication device 709, or installed from the storage device 708, or installed from the ROM 702. When the computer program is executed by the processing device 701, the above functions defined in the method of the embodiments of the present disclosure are performed.

The embodiment of the present disclosure also provides a computer-readable storage medium, on which a computer program is stored, which, when executed in a computer, causes the computer to execute the method for determining a wearing state of an eye-wearable device provided by the present disclosure.

It should be noted that the computer-readable medium described in the embodiment of the present disclosure can be a computer-readable signal medium or a computer-readable storage medium or any combination of these two. The computer-readable storage medium can be, for example, but not limited to, an electrical, magnetic, optical, electromagnetic, infrared, or semiconductor system, device or device, or a combination of any of the above. More specific examples of computer-readable storage media may include, but are not limited to, an electrical connection with one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the above. In an embodiment of the present disclosure, a computer-readable storage medium can be any tangible medium containing or storing a program, which can be used by or in combination with an instruction execution system, apparatus or device. In the embodiment of the present disclosure, the computer-readable signal medium may include a data signal propagated in baseband or as a part of a carrier wave, in which computer-readable program codes are carried. This propagated data signal can take many forms, including but not limited to electromagnetic signals, optical signals or any suitable combination of the above. A computer-readable signal medium can also be any computer-readable medium other than a computer-readable storage medium, which can send, propagate or transmit a program for use by or in connection with an instruction execution system, apparatus or device. The program code contained in the computer-readable medium can be transmitted by any suitable medium, including but not limited to: wires, optical cables, radio frequency (RF), etc., or any suitable combination of the above.

The computer-readable medium may be included in the eye-wearable device; or it can exist alone without being assembled into the eye-wearable device. The computer-readable medium carries one or more programs, and when the one or more programs are executed by the eye-wearable device, the eye-wearable device determines the wearing state of the eye-wearable device according to the image, wherein the eye-wearable device is provided with an image acquisition device, and the image acquisition device is configured to be opposite to the eyes of a user when the eye-wearable device is worn.

Computer program codes for performing the operations of embodiments of the present disclosure may be written in one or more programming languages or their combinations, including object-oriented programming languages, such as Java, Smalltalk, C++, and conventional procedural programming languages, such as "C" language or similar programming languages. The program code can be completely executed on the user's computer, partially executed on the user's computer, executed as an independent software package, partially executed on the user's computer and partially executed on a remote computer, or completely executed on a remote computer or server. In the case involving a remote computer, the remote computer may be connected to a user computer through any kind of network, including a local area network (LAN) or a wide area network (WAN), or may be connected to an external computer (for example, through the Internet using an Internet service provider).

All the embodiments in the present disclosure are described in a progressive way, and the same and similar parts between the embodiments can refer to each other, and each embodiment focuses on the differences from other embodiments. Especially, the embodiments of the storage medium and the computing device are described in a simple way because they are basically similar to the method embodiments, and the relevant points can be found in part of the description of the method embodiments.

Those skilled in the art should realize that in one or more of the above examples, the functions described in the embodiments of the present disclosure can be realized by hardware, software, firmware or any combination thereof. When implemented in software, these functions can be stored in a computer-readable medium or transmitted as one or more instructions or codes on a computer-readable medium.

The specific embodiments described above further details the purpose, technical solution and beneficial effects of the embodiments of the present disclosure. It should be understood that the above is only the specific implementation of the embodiments of the present disclosure, and is not intended to limit the scope of protection of the present disclosure. Any modification, equivalent substitution, improvement or the like made on the basis of the technical solution of the present disclosure should be included in the scope of protection of the present disclosure.

The invention claimed is:

1. A method for determining a wearing state of an eye-wearable device, wherein the eye-wearable device is provided with an image acquisition device, and the image acquisition device is configured to be opposite to eyes of a user when the eye-wearable device is worn, the method comprising:

acquiring an image captured by the image acquisition device, wherein the image comprises a first image recently captured by the image acquisition device and a second image captured by the image acquisition device before capturing the first image; and determining the wearing state of the eye-wearable device according to the image, wherein the determining of the wearing state comprises:

determining whether the eye-wearable device is in a moving state based on an image content difference between the first image and the second image; and in response to determining that the eye-wearable device is in the moving state, outputting information prompting the user to wear the eye-wearable device.

2. The method according to claim 1, wherein the eye-wearable device is further provided with a supplementary light source, and the supplementary light source is configured to supplement light for an image capturing area of the image acquisition device.

3. The method according to claim 2, wherein one supplementary light source is provided, and a distance between the supplementary light source and the image acquisition device does not exceed a preset first distance.

4. The method according to claim 1, wherein one image acquisition device is provided, and the image acquisition device is configured to be opposite to a left eye or a right eye of the user when the eye-wearable device is worn; or at least two image acquisition devices are provided, and the at least two image acquisition devices are configured such that at least one of the at least two image acquisition devices is opposite to the left eye of the user and/or at least one of the at least two image acquisition devices is opposite to the right eye of the user when the eye-wearable device is worn.

5. The method according to claim 1, further comprising:

in response to determining that the eye-wearable device is in a non-moving state, determining whether the eye-wearable device is worn on the eyes based on the first image.

6. The method according to claim 5, wherein determining whether the eye-wearable device is worn on the eyes based on the first image comprises:

inputting the first image into a state classification model to determine a current state category of the eye-wearable device, wherein the current state category represents whether the eye-wearable device is worn on the eyes, and the state classification model is a model trained in advance based on sample images and corresponding state category labels.

7. The method according to claim 6, further comprising:

in response to the current state category indicating that the eye-wearable device is not worn on a face, outputting information which instructs to control the eye-wearable device to be in a standby state;

in response to the current state category indicating that the eye-wearable device is worn on the face but not on the eyes, outputting information which instructs the user to wear the eye-wearable device at a preset accurate wearing position.

8. The method according to claim 6, further comprising:

in response to the current state category indicating that the eye-wearable device is worn on the eyes, performing position identification on human eyes in the first image to obtain a current eye position of the included human eyes;

acquiring a preset standard eye position corresponding to the eye-wearable device, wherein the standard eye position is determined based on a condition that the eye-wearable device is at a preset accurate wearing position;

determining whether a wearing position of the eye-wearable device is accurate based on the current eye position and the standard eye position.

9. The method according to claim 8, wherein performing position identification on human eyes in the first image to obtain the current eye position of the included human eyes, comprising:

performing position identification on human eyes in the first image to determine key point positions of a plurality of eye key points corresponding to the included human eyes; and determining the current eye position based on the key point positions.

10. The method according to claim 8, wherein the determining whether the wearing position of the eye-wearable device is accurate comprises:

in response to determining that a distance between the standard eye position and the current eye position in any specified direction exceeds a preset second distance in the specified direction, it is determined that the wearing position of the eye-wearable device is inaccurate;

in response to determining that the distance between the standard eye position and the current eye position in each specified direction does not exceed the second distance in the specified direction, it is determined that the wearing position of the eye-wearable device is accurate.

11. The method according to claim 8, wherein the current eye position comprises a current left-eye position and a current right-eye position; the standard eye position comprises a standard left-eye position and a standard right-eye position;

determining whether the wearing position of the eye-wearable device is accurate comprises:

in response to determining that a difference between, a distance between the current left-eye position and the standard left-eye position, and, a distance between the current right-eye position and the standard right-eye position, exceeds a preset distance difference, it is determined that the wearing position of the eye-wearable device is inaccurate.

12. The method according to claim 1, wherein there are a plurality of image acquisition devices and a plurality of first images;

determining the wearing state of the eye-wearable device according to the image comprises:

splicing the plurality of first images to obtain a target image; and determining the wearing state of the eye-wearable device at least according to the target image.

13. A non-transitory computer-readable storage medium storing a computer program, wherein the computer program, when executed in a computer, causes the computer to perform a method for determining a wearing state of an eye-wearable device, wherein the eye-wearable device is provided with an image acquisition device, and the image acquisition device is configured to be opposite to eyes of a user when the eye-wearable device is worn, the method comprising:

acquiring an image captured by the image acquisition device, wherein the image comprises a first image recently captured by the image acquisition device and a second image captured by the image acquisition device before capturing the first image; and determining the wearing state of the eye-wearable device according to the image, wherein the determining of the wearing state comprises:

determining whether the eye-wearable device is in a moving state based on an image content difference between the first image and the second image; and in response to determining that the eye-wearable device is in the moving state, outputting information prompting the user to wear the eye-wearable device.

14. An eye-wearable device, comprising a memory and a processor, wherein an executable code is stored in the memory, and when the executable code is executed by the processor, a method for determining a wearing state of the eye-wearable device is realized, wherein the eye-wearable device is provided with an image acquisition device, and the image acquisition device is configured to be opposite to eyes of a user when the eye-wearable device is worn, the method comprising:

acquiring an image captured by the image acquisition device, wherein the image comprises a first image recently captured by the image acquisition device and a second image captured by the image acquisition device before capturing the first image; and determining the wearing state of the eye-wearable device according to the image, wherein the determining of the wearing state comprises determining whether the eye-wearable device is in a moving state based on an image content difference between the first image and the second image; and in response to determining that the eye-wearable device is in the moving state, outputting information prompting the user to wear the eye-wearable device.

15. The storage medium according to claim 14, wherein the method for determining a wearing state of an eye-wearable device further comprises:

in response to determining that the eye-wearable device is in a non-moving state, determining whether the eye-wearable device is worn on the eyes based on the first image.

16. The storage medium according to claim 15, wherein in the method for determining a wearing state of an eye-wearable device, determining whether the eye-wearable device is worn on the eyes based on the first image comprises:

inputting the first image into a state classification model to determine a current state category of the eye-wearable device, wherein the current state category represents whether the eye-wearable device is worn on the eyes, and the state classification model is a model trained in advance based on sample images and corresponding state category labels.

17. The storage medium according to claim 16, wherein the method for determining a wearing state of an eye-wearable device further comprises:

in response to the current state category indicating that the eye-wearable device is not worn on a face, outputting information which instructs to control the eye-wearable device to be in a standby state;

in response to the current state category indicating that the eye-wearable device is worn on the face but not on the eyes, outputting information which instructs the user to wear the eye-wearable device at a preset accurate wearing position.

18. The storage medium according to claim 16, wherein the method for determining a wearing state of an eye-wearable device further comprises:

in response to the current state category indicating that the eye-wearable device is worn on the eyes, performing position identification on human eyes in the first image to obtain a current eye position of the included human eyes;

acquiring a preset standard eye position corresponding to the eye-wearable device, wherein the standard eye position is determined based on a condition that the eye-wearable device is at a preset accurate wearing position;

determining whether a wearing position of the eye-wearable device is accurate based on the current eye position and the standard eye position.

* * * * *